United States Patent
Van Der Hoofden et al.

(10) Patent No.: US 6,956,335 B1
(45) Date of Patent: *Oct. 18, 2005

(54) CIRCUIT ARRANGEMENT

(75) Inventors: Johannes B. A. Van Der Hoofden, Eindhoven (NL); Jozef W. J. Maes, Eindhoven (NL)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 569 days.

(21) Appl. No.: 08/675,665

(22) Filed: Jul. 3, 1996

(30) Foreign Application Priority Data

Jul. 5, 1995 (EP) .................................. 95201834

(51) Int. Cl.[7] ............................................. G09G 3/34
(52) U.S. Cl. ........................ 315/176; 315/170; 363/15; 363/18
(58) Field of Search .............................. 315/176, 170; 363/18, 15

(56) References Cited

U.S. PATENT DOCUMENTS

| | | | | |
|---|---|---|---|---|
| 3,079,525 A | * | 2/1963 | Tap ............................. | 363/18 |
| 4,017,785 A | | 4/1977 | Perper .......................... | 321/4 |
| 4,277,728 A | * | 7/1981 | Stevens ....................... | 315/167 |
| 4,884,180 A | | 11/1989 | Hoffmann .................... | 363/21 |
| 5,266,869 A | * | 11/1993 | Usami ......................... | 315/170 |
| 5,397,965 A | | 3/1995 | Gorille et al. ............... | 315/209 |

FOREIGN PATENT DOCUMENTS

DE          4141804 C1    2/1993   .......... H05B 41/29

* cited by examiner

*Primary Examiner*—Michael B Shingleton

(57) ABSTRACT

A circuit arrangement for operating a lamp including a first circuit and a second circuit. The first circuit generates a second DC voltage from a first DC voltage and includes a transformer. The second circuit is coupled to the secondary winding of the transformer and supplies current for the lamp. The secondary winding, input terminals of the first circuit and second circuit are coupled together such that the second circuit is provided with a voltage whose amplitude is equal to the sum of the first DC voltage and the second DC voltage resulting in a more efficient transfer of power by the circuit arrangement to the lamp.

15 Claims, 1 Drawing Sheet

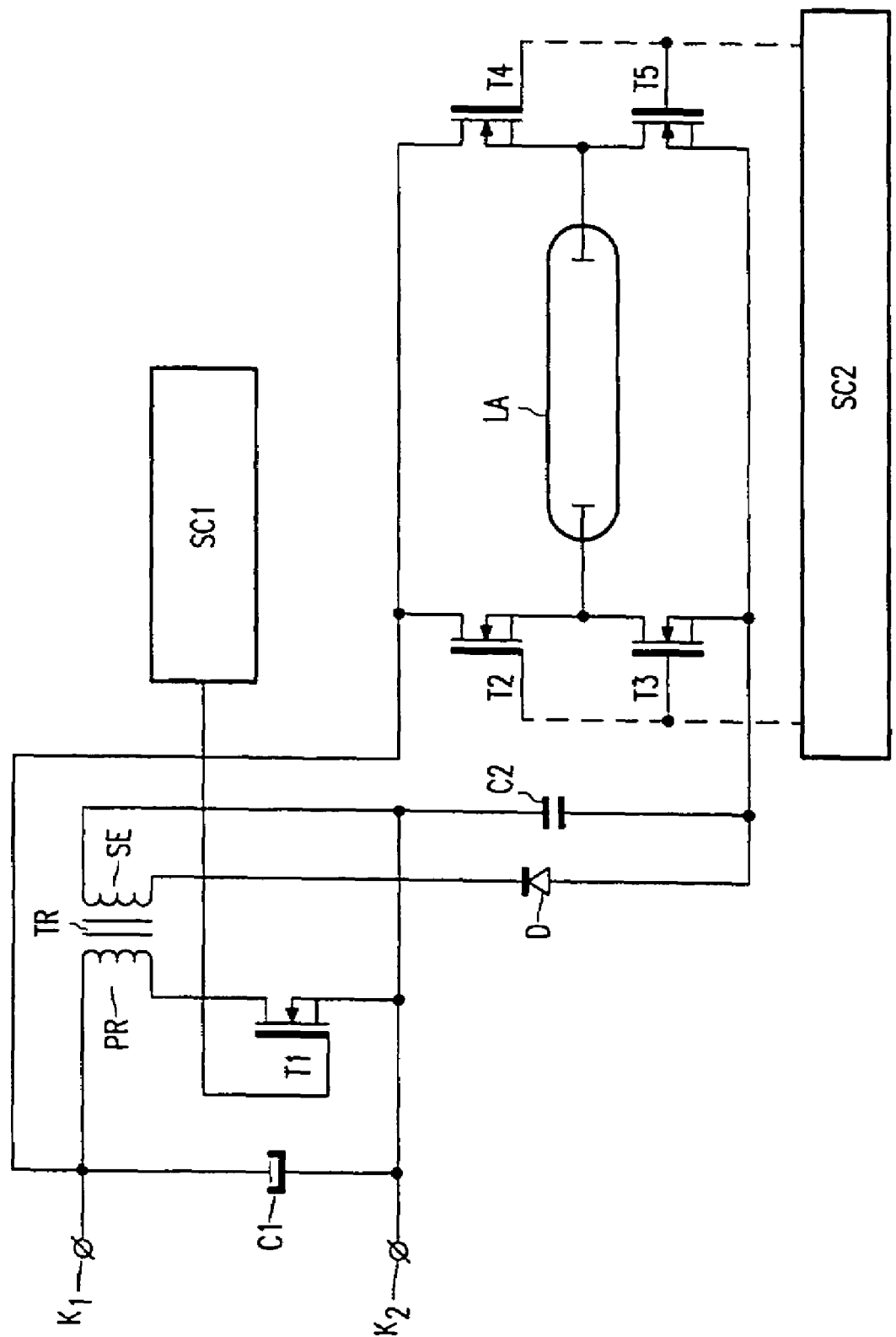

CIRCUIT ARRANGEMENT

BACKGROUND OF THE INVENTION

The invention relates to a circuit arrangement for operating a lamp and, more particularly to a circuit for more efficiently supplying power to a lamp.

Conventional circuit arrangements, such as disclosed in German Patent DE 414804 C1, include a transformer for generating a DC voltage of comparatively high amplitude. As a result, the circuit arrangement renders it possible to operate lamps with a comparatively high burning voltage by means of a supply voltage source having a DC voltage of a comparatively low amplitude. A disadvantage of the known circuit arrangement is, however, that a considerable power dissipation occurs in the components generating the DC voltage of comparatively high amplitude whereby the efficiency of the circuit arrangement is adversely affected.

SUMMARY OF THE INVENTION

The invention has for its object to provide a circuit arrangement with which it is possible to operate lamps with a comparatively high burning voltage by means of a supply voltage source delivering a first DC voltage of comparatively low amplitude such that lower power losses occur in the circuit arrangement during lamp operation.

According to the invention, a circuit arrangement as described in the opening paragraph is for this purpose characterized in that the second winding, the input terminals, and, second means (e.g. bridge circuit) are coupled such that the second means are supplied during lamp operation with voltage whose amplitude is equal to the sum of the first and the second DC voltage.

Owing to the measure according to the invention, part of the power is directly (i.e. not via a transformer) supplied to the second means during lamp operation. Since only part of the power consumed by the second means is supplied through the transformer, the power losses occurring in the transformer are comparatively low. The part of the power supplied directly is equal to the product of the first DC voltage and the current passed by the second means.

Lamp operation by means of a circuit arrangement according to the invention is very efficient when the lamp is a high-pressure discharge lamp. A high-pressure discharge lamp exhibits a behaviour which is called the "run-up" of the high-pressure discharge lamp during a time interval after ignition, the duration of which is a function of the composition of the plasma of the high-pressure discharge lamp. The temperature of the high-pressure discharge lamp rises during this run-up, and as a result the composition of the plasma changes: the discharge vessel of the high-pressure discharge lamp may comprise, for example, substances which are solid at room temperature but which evaporate when the temperature rises so that they will form part of the plasma. As a result of this changing plasma composition, the burning voltage of the high-pressure discharge lamp gradually rises during the run-up from a comparatively low value to the value accompanying stationary lamp operation. The circuit arrangement is often so constructed that the supply voltage of the means II also gradually rises during the run-up. If the power consumed by the high-pressure discharge lamp during run-up is approximately equal to the power consumed during stationary lamp operation, the luminous flux of the high-pressure discharge lamp is considerably lower during run-up than during stationary lamp operation. Such a comparatively low luminous flux during run-up, however, is undesirable or even inadmissible in many applications. To render the luminous flux during the run-up approximately equal to the luminous flux during stationary lamp operation, or to limit the time duration of the run-up, it is necessary to have the high-pressure discharge lamp consume a higher power during the run-up than during stationary lamp operation. Owing to this higher power during run-up and to the fact that the burning voltage of the high-pressure discharge lamp is still comparatively low during the run-up, the lamp current is comparatively high during the run-up. When a known circuit arrangement is used in which the full power consumed by the high-pressure discharge lamp is delivered via the transformer, the power dissipation in the transformer is comparatively great during the run-up. With the use of a circuit arrangement according to the invention, however, the portion of the power delivered directly to the second means is comparatively great because the first DC voltage represents a comparatively great fraction of the supply voltage of the second means (which is comparatively low during the run-up). A considerable improvement of the efficiency of the circuit arrangement is achieved thereby, especially during a phase in lamp operation in which a comparatively high power is supplied to the high-pressure discharge lamp. Thanks to this considerable improvement in efficiency, it has even become possible to construct a circuit for stepping up the voltage from components which satisfy less high requirements as to their power dissipation, so that the circuit arrangement can be made substantially more inexpensive.

In a preferred embodiment of a circuit arrangement according to the invention, the input terminal connected to the cathode of the supply voltage source during lamp operation is also connected to an end of the secondary winding. Since the potential of the cathode of the supply voltage source is often chosen to be ground potential, and the amplitude of the second DC voltage is often considerably higher than that of the first DC voltage, it is achieved thereby that the average potential in the plasma of a discharge lamp operated by the circuit arrangement is negative relative to ground. Diffusion of positively charged ions from the discharge vessel of a discharge lamp is counteracted by this negative average potential in the plasma of the discharge lamp. Such positively charged ions may be, for example, metal ions which form part of the plasma of certain types of high-pressure discharge lamps.

Good results were found with a circuit arrangement wherein the means I comprise a DC-DC converter of the flyback type.

BRIEF DESCRIPTION OF THE DRAWINGS

An embodiment of the invention will be explained in more detail with reference to a drawing, in which FIG. 1 is a diagram of an embodiment of a circuit arrangement according to the invention, with a lamp connected thereto.

DETAILED DESCRIPTION OF THE PREFERRED EMBODIMENTS

In the embodiment shown in FIG. 1, the means I, or first circuit, is formed by input terminals K1 and K2 for connection to a supply voltage source which delivers a first DC voltage, capacitor C1, switching element T1, control circuit SC1, transformer Tr, capacitor C2, and diode D. Means II, or second circuit, is formed by switching elements T2–T5, and control circuit SC2. A lamp La is connected to the means II (second circuit).

Input terminals K1 and K2 are interconnected by a series arrangement of primary winding Pr of transformer Tr and switching element T1. This series arrangement is shunted by capacitor C1. A control electrode of switching element T1 is connected to an output of control circuit SC1 for rendering the switching element conducting and non-conducting with high frequency. Secondary winding SE of transformer Tr is shunted by a series arrangement of a capacitor C2 and a diode D. Diode D in this embodiment forms a unidirectional element. Input terminal K1, which is connected to the anode of the supply voltage source during lamp operation, is connected to a common junction point of capacitor C2 and diode D via a series arrangement of switching elements T2 and T3. The series arrangement of switching elements T2 and T3 is shunted by a series arrangement of switching elements T4 and T5. Control electrodes of switching elements T2–T5 are connected to outputs of the control circuit SC2. These connections are indicated in FIG. 1 with broken lines. A common junction point of switching element T2 and switching element T3 is connected to a first end of the lamp La, and a common junction point of switching elements T4 and T5 is connected to a further end of the lamp La.

The operation of the circuit arrangement shown in FIG. 1 is as follows.

When the input terminals K1 and K2 are connected to a supply voltage source delivering a first DC voltage, the control circuit SC1 renders the switching element T1 conducting and non-conducting with high frequency. The second DC voltage is present across capacitor C2 as a result of this. The supply voltage of the means II is present across the series arrangement of switching elements T2 and T3 and has an amplitude equal to the sum of the first and the second DC voltage. The control circuit SC2 renders the switching elements T2 and T5 and the switching elements T3 and T4 conducting and non-conducting alternately with low frequency. As a result, a low-frequency commutated direct current flows through the lamp whose amplitude can be controlled by means which are not shown in FIG. 1. The total power dissipated by the means II is equal to the supply voltage of means II (= first DC voltage+second DC voltage) multiplied by the current passed by the means II, which is equal to the lamp current. Of this total power, a portion equal to the first DC voltage multiplied by the current passed by the means II is supplied directly to the means II, so that the power dissipation in the means I is comparatively limited.

When the lamp La is a high-pressure discharge lamp, the lamp voltage is comparatively low during the run-up, after lamp ignition. The control circuit SC1 controls the second DC voltage, and thus also the supply voltage of the means II at a comparatively low level adapted to the lamp voltage. At the same time, however, a comparatively strong current is passed by the means II during the run-up in order to limit the time duration of the run-up and/or render the luminous flux of the lamp during run-up substantially equal to the luminous flux during stationary lamp operation. A considerable power is directly supplied to the means II during the run-up, both in absolute terms (because of the comparatively strong current passed by the means II) and in relative terms (because of the comparatively low supply voltage of the means II). The power dissipation in means is accordingly considerably reduced during the phase of lamp operation in which a comparatively high power is transmitted from the supply voltage source to the lamp.

Since the second DC voltage often has a considerably higher amplitude in practice than the first DC voltage, and the input terminal K2 is connected to ground potential, the average potential in the lamp plasma is negative relative to ground potential during lamp operation. Diffusion of positive ions from the discharge vessel of the lamp is prevented thereby.

The following results were found for a practical realization of a circuit arrangement as shown in FIG. 1 with which a high-pressure discharge lamp with a power rating of 35 W was operated by means of a battery delivering a supply voltage of 12 V. Lamp voltage during stationary lamp operation was 85 V. Immediately after ignition, however, the burning voltage of the lamp was 29 V. To accelerate the run-up and to make the luminous flux of the lamp comparatively high immediately after ignition, a total power of 75 W was supplied to the lamp immediately after ignition. Of this total power, approximately 31 W was supplied directly to the means II.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A circuit arrangement for operating a discharge lamp, the circuit arrangement having reduced power loss, comprising:
   a first circuit for generating a second DC voltage from a first DC voltage, including
      input terminals for connection to a voltage source having a cathode and an anode for supplying the first circuit with the first DC voltage,
      a switching element,
      a control circuit coupled to the switching element for changing the conductive state of the switching element,
      a unidirectional element, and
      a transformer having a primary and a secondary winding; and
   a second circuit coupled to the secondary winding for supplying current to the discharge lamp;
   wherein the secondary winding, the input terminals, and the second circuit are coupled together such that the second circuit is supplied by a voltage whose amplitude is equal to the sum of the first DC voltage and the second DC voltage in order to transfer some power from the voltage source directly to the second circuit without passing through the transformer,
   thereby avoiding power loss that would result if the power directly transferred from the voltage source to the second circuit were instead transferred to the second circuit through the transformer.

2. The circuit arrangement as claimed in claim 1, wherein the lamp is a high-pressure discharge lamp.

3. The circuit arrangement as claimed in claim 1, wherein the first circuit comprises a DC-DC converter of the flyback type.

4. The circuit arrangement as claimed in claim 2, wherein the first circuit comprises a DC-DC converter of the flyback type.

5. The circuit arrangement as claimed in claim 3, wherein the first circuit comprises a DC-DC converter of the flyback type.

6. A circuit arrangement for operating a discharge lamp, the circuit arrangement having reduced power loss, comprising:
- a first circuit for generating a second DC voltage from a first DC voltage, including
  - input terminals for connection to a voltage source having a cathode and an anode for supplying the first circuit with the first DC voltage,
  - a switching element,
  - a control circuit coupled to the switching element for changing the conductive state of the switching element,
  - a unidirectional element, and
  - a transformer having a primary and a secondary winding; and
- a second circuit coupled to the secondary winding for supplying current to the discharge lamp,
- wherein the input terminal connected to the cathode of the voltage source during lamp operation is also directly connected to an end of the secondary winding, and
- wherein the secondary winding, the input terminals, and the second circuit are coupled together such that the second circuit is supplied by a voltage whose amplitude is equal to the sum of the first DC voltage and the second DC voltage in order to transfer some power from the voltage source directly to the second circuit without passing through the transformer,
- thereby avoiding power loss that would result if the power directly transferred from the voltage source to the second circuit were instead transferred to the second circuit through the transformer.

7. The circuit arrangement as claimed in claim 1 wherein the control circuit controls the switching element so that the switching element is not self-oscillating.

8. The circuit arrangement as claimed in claim 1 wherein the first circuit further comprises;
- first means for coupling the switching element and the primary winding of the transformer in a first series circuit to said input terminals,
- a capacitor, and
- second means for coupling the unidirectional element and the capacitor in a second series circuit to the transformer secondary winding.

9. The circuit arrangement as claimed in claim 8 further comprising;
- means connecting the anode terminal of the input terminals to a first input of the second circuit via a circuit path that excludes the first circuit thereby to supply the second circuit with said first DC voltage.

10. The circuit arrangement as claimed in claim 9 further comprising;
- second means connecting a second input of the second circuit to a circuit point between the capacitor and the unidirectional element.

11. The circuit arrangement as claimed in claim 1 further comprising;
- means connecting a first input terminal to a first input of the second circuit via a circuit path that excludes the first circuit thereby to supply the second circuit with said first DC voltage.

12. The circuit arrangement as claimed in claim 11 wherein the second circuit includes at least second and third switching elements coupled to output terminals adapted for connection to the discharge lamp,
- the control circuit switches the first switching element at a high frequency, and the circuit arrangement further comprises;
- a further control circuit that switches the second and third switching elements on and off at a low frequency.

13. A circuit arrangement for operating a discharge lamp comprising:
- a first circuit for generating a second DC voltage from a first DC voltage, including
- input terminals for connection to a voltage source for supplying the first circuit with the first DC voltage,
- a switching element coupled to the input terminals,
- a control circuit coupled to the switching element for turning the switching element on and off at a high frequency,
- a unidirectional element, and
- a transformer having a primary winding and a secondary winding; and
- a second circuit coupled to the secondary winding and to output terminals for supplying current to a discharge lamp; and
- means coupling the secondary winding, the input terminals, and the second circuit together such that the second circuit is supplied with a voltage whose amplitude is equal to the sum of the first DC voltage and the second DC voltage.

14. The circuit arrangement as claimed in claim 13 further comprising;
- means connecting a first input terminal to a first input of the second circuit via a circuit path that excludes the first circuit thereby to supply the second circuit with said first DC voltage.

15. The circuit arrangement as claimed in claim 14 further comprising;
- a capacitor, and
- means for coupling the capacitor and the unidirectional element to the transformer secondary winding and to a second input of the second circuit.

* * * * *